United States Patent [19]

Riechmann

[11] 3,766,314

[45] Oct. 16, 1973

[54] STABILIZED LOW VOLTAGE SUPPLY CIRCUIT IN SOLID-STATE T.V. RECEIVERS

[75] Inventor: Werner Riechmann, Sibbesse, Germany

[73] Assignee: Blaupunkt-Werke GmbH, Hildesheim, Germany

[22] Filed: Apr. 3, 1972

[21] Appl. No.: 240,473

[30] Foreign Application Priority Data

Apr. 2, 1971 Germany.................. P 21 16 167.1

[52] U.S. Cl...... 178/7.3 R, 178/DIG. 11, 315/27 R, 323/22 SC

[51] Int. Cl............................................... H04n 3/18

[58] Field of Search................. 178/DIG. 11, 7.3 R, 178/7.5 R; 315/27 R, 27 TD; 323/22 SC

[56] References Cited

UNITED STATES PATENTS

| | | | |
|---|---|---|---|
| 3,436,591 | 4/1969 | Grundmann | 315/27 R |
| 3,461,232 | 8/1969 | Wendt | 178/DIG. 11 |
| 3,621,134 | 11/1971 | Waring | 178/DIG. 11 |

*Primary Examiner*—Robert L. Richardson
*Attorney*—Robert D. Flynn et al.

[57] ABSTRACT

To obtain stabilized low voltage from the horizontal deflection circuit of a T.V. receiver, an additional winding is inductively coupled to the charging inductance in the horizontal deflection circuit, and a rectifier circuit is connected to the additional winding to be responsive to peak voltage value across the additional winding and supply the low voltage. The inductivity of the inductance is of such value that a voltage maximum appears at the inductance during the energy supply interval which is independent of changes in loading on the horizontal deflection circuit, for example by adjusting the inductivity that the peak value thereacross is reached within the first two thirds of the energy supply interval, that is, during line trace; a parallel R-C network can be connected into the horizontal deflection circuit so that, when the voltage thereacross exceeds a predetermined level, the excess voltage can be sensed to disconnect the controllable rectifier of the deflection circuit and inhibit further application of power to the inductance upon sensing of an excess voltage level.

5 Claims, 4 Drawing Figures

STABILIZED LOW VOLTAGE SUPPLY CIRCUIT IN SOLID-STATE T.V. RECEIVERS

CROSS REFERENCE TO RELATED APPLICATION

RIECHMANN; "CENTERING CIRCUIT FOR TELEVISION RECEIVERS"; U.S. Ser. No. 240,643, filed Apr. 3, 1972.

The present invention relates to a low-voltage supply circuit for incorporation in a television receiver having a horizontal deflection circuitry, and more particularly to a solid-state T.V. receiver in which the energy for operation of the horizontal deflection circuit is obtained from a constant voltage source over a charging inductance.

Television receivers which are fully transistorized in many instances use controllable semiconductors in their horizontal deflection circuit. These deflection circuits have a high degree of reliability. A complete deflection circuit of such type is shown, for example, in U.S. application Ser. No. 721,383, now U.S. Pat. No. 3,452,244.

Television receivers of this type require supply of various semiconductor stages with a comparatively low-voltage but stabilized operating potential. It has been proposed to utilize line voltage transformers together with a rectifier system which provides a stabilized output voltage. It is of advantage, however, to obtain the stabilized low voltage without the cost and space requirements of a line transformer. It has previously been proposed (see U.S. Patent application Ser. No. 477,718, now U.S. Pat. No. 3,436,591, to connect a resistance-condenser parallel circuit (R-C network) in series with a controlled silicon rectifier (SCR) which, during line retrace, is rendered conductive. In accordance with this proposal, an energy storage condenser which is connected in the horizontal deflection circuit, in parallel, is discharged during line retrace by an SCR in parallel thereto, so that at least a portion of the charge is accepted or transferred to the R-C network. The R-C network will then have a voltage thereacross which can be applied to other stages of the T.V. receiver, such as, for example, to the vertical deflection stage. The d-c voltage should be substantially stabilized so that other stages, to be supplied with low voltage, can be supplied therefrom, which have a lower voltage level than the horizontal deflection circuit. It has been found, however, that the stability and constancy of this d-c voltage is not sufficient since changes in loading at the output of the horizontal deflection circuit reflect back to the d-c voltage. Thus, an additional stabilizing network has been required.

It is an object of the present invention to provide a circuit in which low-voltage power for supply to the other stages of a completely solid-state television receiver can be obtained simply and reliably, with good regulation.

SUBJECT MATTER OF THE PRESENT INVENTION

Briefly, the deflection circuit includes controlled semiconductors, preferably thyristors, which provide the required energy over a controllable charging inductance from a constant voltage source. The controlled charging inductance, in accordance with the invention, has an additional winding inductively coupled thereto. A rectifier is connected to the additional winding, which is responsive to peak voltage therein. The inductivity of the charging inductance is so arranged that the charging inductance, during the charging phase, or current carrying cycle thereof has a voltage maximum appear thereacross which is independent of changes in loading on the horizontal deflection circuit.

By use of a sufficiently dimensioned constant voltage source for the horizontal deflection circuit, all low-voltage requirements of the entire television circuit can be supplied from the rectifier circuit. The rectifier circuit connected to the additional winding provides an approximately constant output independent of changes in loading on the output of the horizontal deflection circuit. Such changes in loading may arise, for example, due to changes in beam current of the cathode ray tube, independently of the supply voltage.

The inductivity is so arranged that the rate of change of current flowing therethrough reaches a maximum at a time which is in advance of the total time the current is flowing, so that the peak voltage sensed by the peak rectifier circuit connected to the inductively coupled winding will be unaffected by any changes in current flow after the peak has been passed.

In accordance with a feature of the present invention, an R-C parallel network can be connected in a branch of the horizontal deflection circuit across which a voltage can be sensed which can be used to disconnect the supply of power for the deflection circuit if the circuit is overloaded. This provides effective protection of the various stages, as well as of the constant voltage supply of the television receiver and protects against overload, for example arising due to a short circuit.

The invention will be described by way of example with reference to the accompanying drawings, wherein.

Figures 1, 2:
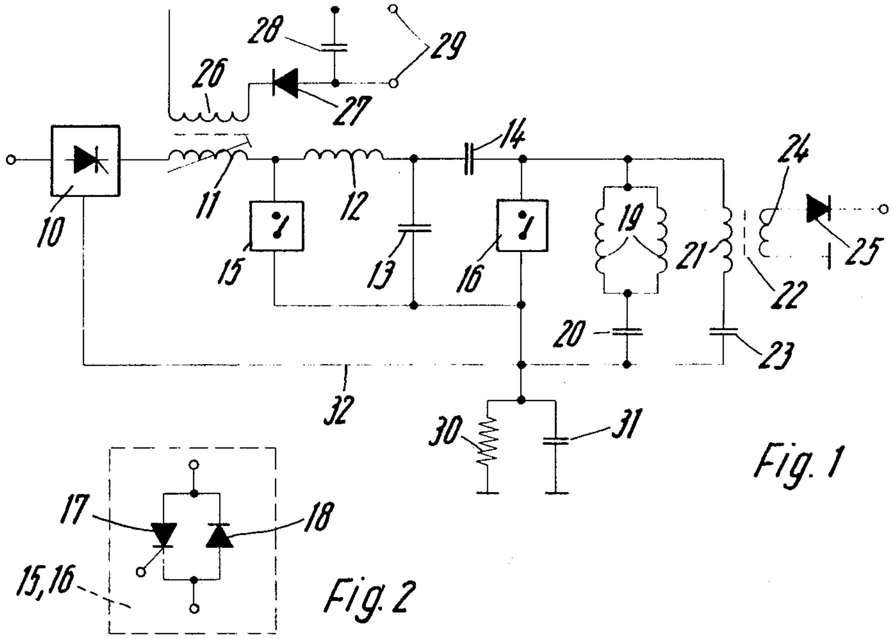
FIG. 1 shows, highly schematically, a horizontal deflection circuit with a low voltage supply circuit in accordance with the invention.
FIG. 2 shows the detail circuit of a switch in accordance with FIG. 1.
Figure 4:
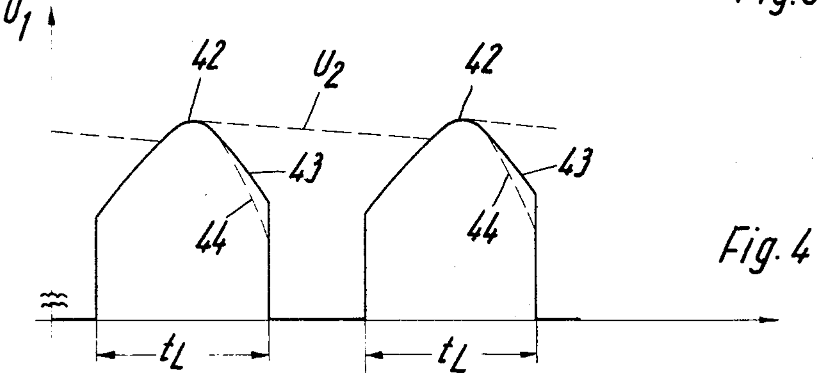

and FIG. 4 illustrates the charge voltage $U_1$ on the charge inductance of the circuit in accordance with the present invention and as seen in FIG. 1.

A constant voltage source 10 which may, for example, be an SCR controlled rectifier circuit provides energy over a controllable charge inductance 11 to the horizontal deflection circuit. The charge inductance 11 has a second inductance 12 connected in series thereto, which serves as a commutating coil. Two storage condensers 13, 14 are connected to the inductance 12. A pair of controlled switches 15, 16 are connected with the junction of inductances 11, 12 and the other side of condenser 14, respectively, as seen in FIG. 1. The detailed construction of any one of switches 15, or 16 is best seen in FIG. 2, and includes an SCR 17 which has, in parallel thereto and oppositely poled with respect thereto, a diode 18. The horizontal deflection coils 19 are connected in parallel to the switch 16, and connected in series with a condenser 20. A primary winding 21 of the horizontal deflection transformer 22 is connected in series with a further condenser 23. High-voltage winding 24 of the deflection transformer 22 is connected to a voltage multiplying circuit 25 to obtain the required high voltage, the voltage multiplying circuit and the remainder of the T.V. receiver circuit not being shown and well known in the art.

The circuit, as described to here, is known and is shown, for example, in U.S. Pat. application Ser. No. 721,383, which also sets forth the operation in detail.

Briefly, switches 15, 16 are controlled by the TV circuit and, for purposes of this invention, have the function to control the charging current flow to the condensers 13, 14. The swtiches are controlled to open after beginning of the line trace interval and to open before the end thereof, so that the condensers 13, 14 will be connected only during a portion of this interval, so that they will be reliably charged.

In accordance with the present invention, the charging inductance 11 has an additional winding 26 wound thereon and inductively coupled thereto in the form of a transformer winding. Winding 26 has a rectifier 27 in series thereto, to which further a filter condenser 28 is connected, in parallel across the output terminals 29 for the low-voltage supply. The inductance of inductivity 11 is adjusted and set in a certain manner — as will be detailed below. In addition, a parallel R-C network formed of resistances 30 and condenser 31 is connected in a branch of the circuit, and further connected to a feedback and control line 32 which connects back to the source of supply 10, to provide a turn-off or inhibit signal thereto.

Figure 3:
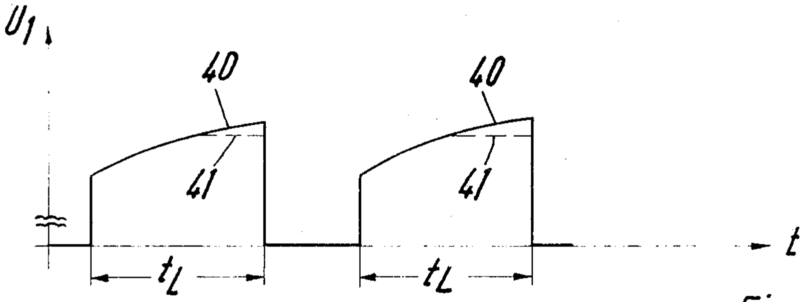
FIG. 3 is a graph illustrating the charge voltage $U_1$ across the charge inductance in a known solid-state horizontal deflection circuit, in accordance with prior art.

The operation of the circuit is best understood by considering FIGS. 2 and 4; FIG. 3 illustrates the charge voltage $U_1$ on the charge inductivity 11, in accordance with the circuit of the prior art. The inductivity of the charging inductance 11 has a relatively high value, so that the charge voltage $U_1$ during the energy supply interval, that is, during the charging cycle $t_L$ will be substantially linear, as seen in FIG. 3. During the charging phase $t_L$, charging condensers 13, 14 in the horizontal deflection circuit are being charged. The charging phase $t_L$ starts at a later period of time than the line trace itself, and also terminates in advance of the line trace, since switches 15 and 16, which also controls the line retrace are closed until after line trace has begun and are closed again in advance of termination of the line tracing. The charging phase time $t_L$ for the storage condensers 13, 14 is, therefore, within the line trace interval.

The charge voltage $U_1$ follows curve 40. Upon a change in loading on the horizontal deflection circuit for example caused by changes in beam current, normal charge curve 40 will change to assume the form of dashed curve 41. This changes the value of the charge voltage $U_1$ at which the charge retrace, upon closing of switch 15, will commence. Likewise, the peak value of the charge voltage $U_1$ is changed.

In accordance with the invention, the circuit is so arranged that the charge voltage $U_1$ will be as seen in FIG. 4. The value of inductivity of the charge inductance 11 is decreased to a lower value, so that the maximum voltage will occur within the first two thirds of the charge time $t_L$ —see curve 42. As can be seen, the switch-off point in advance, or upon beginning of the retrace period is now in the decreasing portion 43 of the voltage arising during the charging phase time $t_L$. If there are changes in the loading on the horizontal deflection circuit, the value of the peak charge voltage $U_1$ will not change, since the total voltage across the inductance will follow the graph seen in curve 44, and the peak value $U_1$ is maintained. This voltage is transferred over the additional winding 26, and coupled to the rectifier circuit, where a d-c voltage is obtained across terminals 29. The rectifier circuit operates as a peak rectifier and a voltage $U_2$ which is substantially constant is obtained, independent of changes in loading at the output of the horizontal deflection circuit. The blunt or broad peak of the charge voltage $U_1$ provides a large phase angle during which time maximum current flow will result. The internal resistance of the low-voltage supply circuit is low so that additional stabilization of the output direct voltage $U_2$ , as an operating voltage for other stages in the television receiver, is not required.

The R-C parallel circuit 30, 31 is inserted in a branch of the horizontal deflection circuit, from which a voltage can be obtained which is applied over a control line 32 to the constant voltage source 10. The value of the voltage across the R-C circuit is a measure of the loading of the horizontal deflection circuit, and further of the loading applied by the low-voltage supply circuit 26, 27, 28, and drawing current from terminals 29. Upon overloading of either of the low-voltage circuits from terminals 29, or of the horizontal deflection circuit, the current through inductance 11 and the entire circuit will rise, thus causing an increase in voltage drop across the R-C circuit 30, 31. The voltage drop across resistance 30, then, is coupled back by control line 32 to the supply circuit 10 where, over a threshold circuit (well known and not specifically shown in the drawings), the supply circuit 10 is disabled, or isolated from the remainder of the circuit, thus interrupting supply of energy to the deflection circuit as well as to the low-voltage supply. This very simple arrangement provides an inherent fail-safe circuit in which the various stages of the television receiver which are supplied from terminal 29 with low voltage, as well as the horizontal deflection circuit, and the constant current source are protected from damage due to overloading, for example due to an inherent short circuit.

It appears that the value of the inductance 11 should preferably be so dimensioned that the rate of change of flux $(d\phi/dt)$ thereof reaches a maximum in advance of termination of current flow through the inductance to provide a low voltage responsive to the peak induced voltage and essentially independent of loading on the deflection circuit; a current having a lesser rate of $d\phi/dt$and occurring during the terminal portion of the energy supply interval, even if the current itself is higher due to overload, will then no longer affect the output peak voltage. Dimensioning the inductivity of the inductance to have this peak value occur in advance of termination of current flow and, preferably at about two-thirds of the time of current flow has been found to be suitable.

I claim:

1. Stabilized low-voltage supply circuit for solid state T.V. receivers having a horizontal deflection circuit including a controllable rectifier (10) connected to the horizontal deflection circuit of the receiver;

an inductance (11);

and a storage condenser means (13, 14) connected to the inductance (11), charging energy for the storage condenser means (13, 14) being applied over the controllable rectifier (10) through the inductance (11) to the storage condenser means during line tracing intervals and being stored in the storage condenser means, said circuit comprising means (15, 16) connected to and controlling application of energy during the line tracing interval to the charging condenser means (13, 14) to persist for a predetermined supply interval ($t_L$);

an additional winding (26) inductively coupled to the inductance (11);

and a peak rectifier circuit (27, 28) connected to the additional winding to be responsive to peak values of voltage induced in the additional winding and to supply the low voltage (29) from said rectifier, the inductivity of the inductance being of such value with respect to the duration of the energy supply interval ($t_L$) that a voltage maximum appears at said inductance intermediate of the energy supply interval ($t_L$) and which is independent of changes of loading on the horizontal deflection circuit.

2. Circuit according to claim 1, wherein the value of the inductance is dimensioned such that the peak voltage thereacross is reached within the first two thirds of the energy supply interval ($t_L$).

3. Circuit according to claim 1, wherein the value of the inductance is so dimensioned that the voltage thereacross reaches a maximum in advance of termination of the energy supply interval ($t_L$) to provide, in the additional winding (26) a low voltage responsive only to the maximum voltage across the inductance and which is unvarying and essentially independent of loading on the deflection circuit which may occur during the terminal portion of the energy supply interval.

4. Circuit according to claim 1, further comprising a parallel R-C network (30, 31) connected in the horizontal deflection circuit, said R-C network having a voltage appearing thereacross which, when the potential induced in the inductance (11) exceeds a predetermined level, increases beyond a threshold level;

and means (32) transferring this voltage to the controllable rectifier (10) to provide a diabling control voltage to disable the rectifier and interrupt further application of power to the inductance and hence the low-voltage supply and the deflection circuit upon sensing of said increased voltage level.

5. Circuit according to claim 1, wherein the value of inductance is so dimensioned with respect to the energy supply interval ($t_L$) that the rate of change of flux ($d\phi/dt$) in the inductance reaches a maximum in advance of termination of current flow through the inductance to provide an induced voltage in the additional winding (26) which is responsive to peak induced voltage and essentially independent of loading on the deflection circuit caused by changes in current having a lesser rate of change ($d\phi/dt$) occurring during the terminal portion of the energy supply interval.

* * * * *